(12) United States Patent
Martin

(10) Patent No.: US 10,270,188 B2
(45) Date of Patent: *Apr. 23, 2019

(54) BONDING CLAMP

(71) Applicant: Hubbell Incorporated, Shelton, CT (US)

(72) Inventor: Evan Ronald Martin, Merrimack, NH (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/989,692

(22) Filed: May 25, 2018

(65) Prior Publication Data

US 2018/0277964 A1    Sep. 27, 2018

Related U.S. Application Data

(63) Continuation of application No. 15/382,613, filed on Dec. 17, 2016, now Pat. No. 9,985,361.

(60) Provisional application No. 62/271,109, filed on Dec. 22, 2015.

(51) Int. Cl.
| | |
|---|---|
| *H01R 4/24* | (2018.01) |
| *H01R 4/40* | (2006.01) |
| *H02S 40/34* | (2014.01) |
| *H01R 4/26* | (2006.01) |
| *F24S 25/636* | (2018.01) |
| *H01R 4/64* | (2006.01) |
| *H02S 40/36* | (2014.01) |

(52) U.S. Cl.
CPC ............. *H01R 4/40* (2013.01); *F24S 25/636* (2018.05); *H01R 4/26* (2013.01); *H01R 4/64* (2013.01); *H02S 40/34* (2014.12); *H02S 40/36* (2014.12); *Y02E 10/47* (2013.01)

(58) Field of Classification Search
CPC .................................................... H01R 4/2433
USPC .......................................... 439/431–433, 444
See application file for complete search history.

(56) References Cited

U.S. PATENT DOCUMENTS

| | | |
|---|---|---|
| 1,489,835 A | 4/1924 | Kietz |
| 1,932,009 A | 10/1933 | Becker |
| 3,425,028 A | 1/1969 | Neaderland |
| 3,509,517 A | 4/1970 | Gutshall |
| 4,496,791 A | 1/1985 | Reichert |
| 4,825,513 A | 5/1989 | Verespej |

(Continued)

FOREIGN PATENT DOCUMENTS

| | | |
|---|---|---|
| FR | 2456401 | 12/1980 |
| WO | 2016205817 | 12/2016 |

OTHER PUBLICATIONS

International Search Report and Written Opinion mailed in corresponding PCT Application PCT/US16/67398 dated Mar. 14, 2017, 10 pages.

*Primary Examiner* — Phuong K Dinh
(74) *Attorney, Agent, or Firm* — Wissing Miller LLP

(57) ABSTRACT

Bonding clamps used to assembly photovoltaic (PV) arrays and provide an electrical bond between PV module frames forming part of the PV arrays is provided. The bonding clamp includes an electrically conductive body, at least one electrical bonding member extending from the body, and at least one pressure member extending from the body. The bonding clamp may also include one or more spacers to provide a uniform spacing between PV module frames.

20 Claims, 15 Drawing Sheets

(56) References Cited

U.S. PATENT DOCUMENTS

| | | |
|---|---|---|
| 4,968,268 A | 11/1990 | Oh |
| 8,353,650 B2 | 1/2013 | Wiley et al. |
| 8,505,864 B1 | 8/2013 | Taylor |
| 9,689,411 B2 | 6/2017 | Meine |
| 9,985,361 B2 * | 5/2018 | Martin .................... H01R 4/40 |
| 2012/0244729 A1 | 9/2012 | Rivera et al. |
| 2014/0010616 A1 | 1/2014 | Meine et al. |
| 2015/0101655 A1 | 4/2015 | Schuit et al. |

* cited by examiner

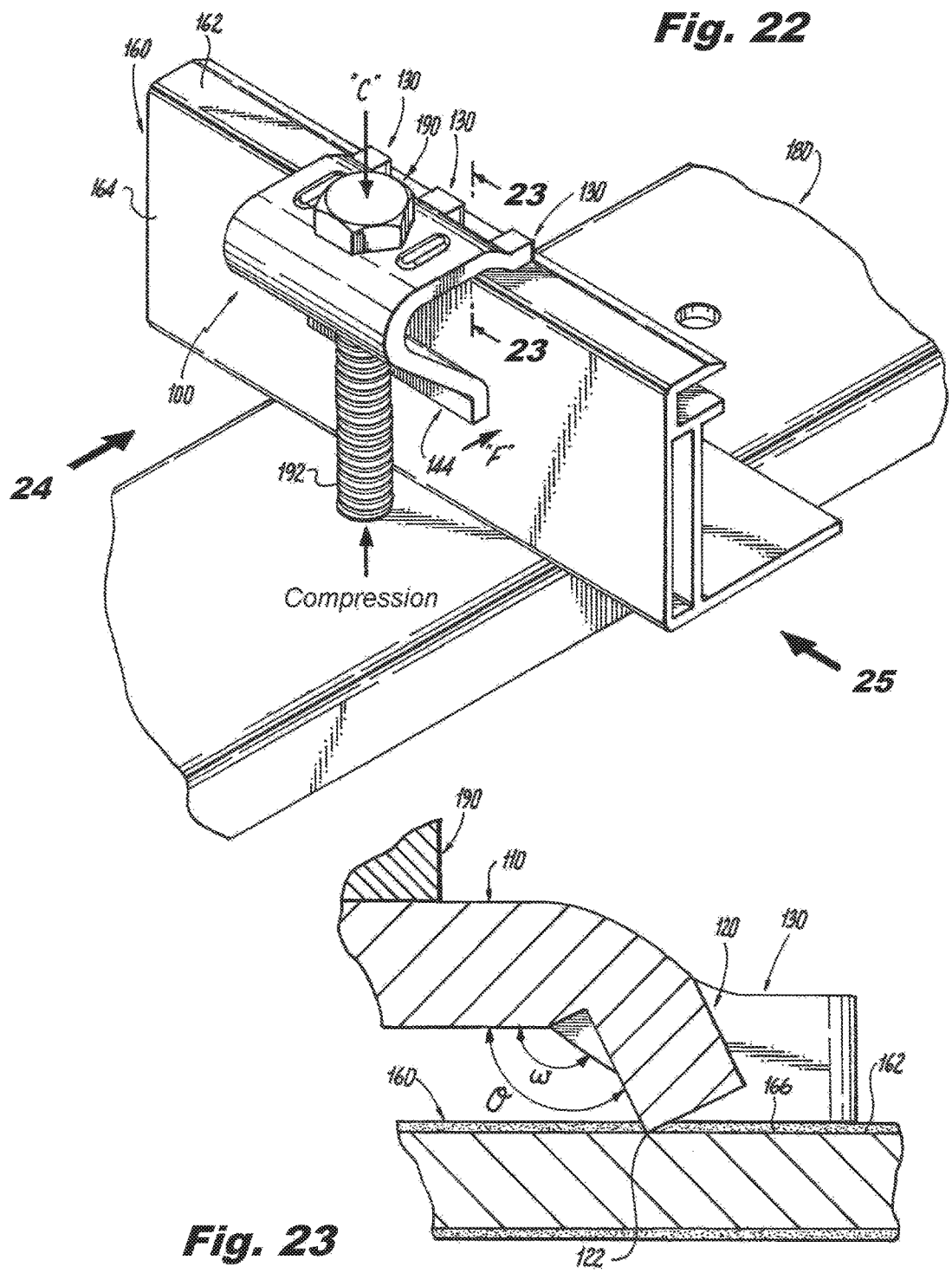

BONDING CLAMP

CROSS REFERENCE TO RELATED APPLICATIONS

This application is a continuation of application Ser. No. 15/382,613 filed Dec. 17, 2016 (now U.S. Pat. No. 9,985,361), and claims benefit from U.S. Provisional Application Ser. No. 62/271,109 filed Dec. 22, 2015 the contents of both are herein incorporated by reference in their entirety.

BACKGROUND

Field

The present disclosure relates generally to bonding clamps, and more particularly to bonding clamps used to secure photovoltaic module frames to rail systems while providing an electrical bonding between the frames and rail system.

Description of the Related Art

Photovoltaic arrays are typically composed of a number of photovoltaic modules set within a metallic frame, and a rail system that supports the photovoltaic modules. When installing a photovoltaic array, a number of photovoltaic modules are assembled onto the rail system, which is sometimes called rails or racking structures. The metallic frames of the individual photovoltaic modules, and the structural pieces, e.g., the rails, on which the modules mount are generally made out of aluminum, which is typically anodized to resist corrosion. Although the frames of the photovoltaic modules are directly bolted or clamped to the rails, the anodizing insulates the metal structures so that they are not electrically bonded unless measures are taken to electrically bond them.

Like other sources of electrical power, to ensure safety, the metal frames of the photovoltaic modules and the metal rails on which they are secured are often required by national or local electrical codes to be electrically bonded. Electrical bond and/or electrically bonded are used here in the technical sense to mean forming an electrically conductive path between the metal structures to ensure electrical continuity between the metal structures sufficient to safely conduct any electrical current imposed on the metal structures.

To electrically bond the metal structures, a common practice in the industry is to install a separate grounding lug on each piece that is anodized, or a separate grounding washer between anodized metal structures. A grounding lug is attached to the sheet metal frame of the photovoltaic modules with a thread forming stainless steel screw. Since the screw cuts into the aluminum it forms a connection which can maintain an electrical bond over time. However, a common sheet metal thickness is fairly thin, e.g., 0.080 inch, and a common screw size is 10-32 so that the screw therefore only makes connection on about 2½ threads, which provides a marginally acceptable surface contact area in terms of mechanical strength and electrical conductivity. Using separate bonding washers between metal structures provides a larger electrical contact area for an improved electrical bonding connection. However, adding grounding lugs or separate bonding washers increases the cost to install photovoltaic arrays, in terms of supplies, and in terms of labor costs to install the separate bonding components.

SUMMARY

The present disclosure provides descriptions of embodiments for bonding clamps used to assemble photovoltaic (PV) arrays and provide an electrical bond between PV module frames and between PV module frames and rail systems forming the PV arrays. In one exemplary embodiment, the bonding clamp includes an electrically conductive body, at least one electrical bonding member extending from the body, at least one pressure member extending from the body, and at least one spacer member extending from the body. The electrically conductive body has a top surface, a bottom surface, and a mounting structure, such as an aperture, for receiving a mounting fastener. The at least one spacer may include a first spacer member extending from the body in a direction away from the bottom surface of the body, and the second spacer member extending from the body in a direction away from the bottom surface of the body. In this exemplary embodiment, the at least one pressure member extending from the body may have an offset, such that a frame engaging surface of the at least one pressure member lies in a different plane than the bottom surface of the body.

In another exemplary embodiment, the bonding clamp includes an electrically conductive body having a top surface, a bottom surface, a pair of spacer sides, a pair of frame sides, and an aperture for receiving a mounting fastener. At least one electrical bonding member extends from a first of the pair of frame sides, and at least one electrical bonding member extends from a second of the pair of frame sides. At least one pressure member extends from the first of the pair of frame sides, and at least one pressure member extends from the second of the pair of frame sides. The bonding clamp according to this embodiment also includes a first spacer member that extends from the body, such as extending from a first of the pair of spacer sides in a direction away from the bottom surface of the body. A second spacer member extends from the body, such as extending from a second of the pair of spacer sides in a direction away from the bottom surface of the body. The at least one pressure member according to this embodiment extending from the first of the pair of frame sides may include an offset such that a frame engaging surface of the at least one pressure member lies in a different plane than the bottom surface of the body.

In another exemplary embodiment, the bonding clamp includes an electrically conductive body having a top surface, a bottom surface, a first frame side, a second frame side, and a mounting structure, such as an aperture, for receiving a mounting fastener. At least one electrical bonding member extends from the first frame side, and at least one pressure member extends from the first frame side. A frame pusher member is coupled to the second frame side of the body. The at least one pressure member may have an offset such that a frame engaging surface of the at least one pressure member lies in a different plane than the bottom surface of the body.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein:

FIG. 22 is a top perspective view of a portion of a photovoltaic array with the bonding clamp of FIG. 16 connecting and bonding a photovoltaic module frame to a rail;

FIG. 23 is an enlarged partial cross-sectional view of the bonding clamp in FIG. 22 taken along line 23-23;

DETAILED DESCRIPTION

Figure 1:
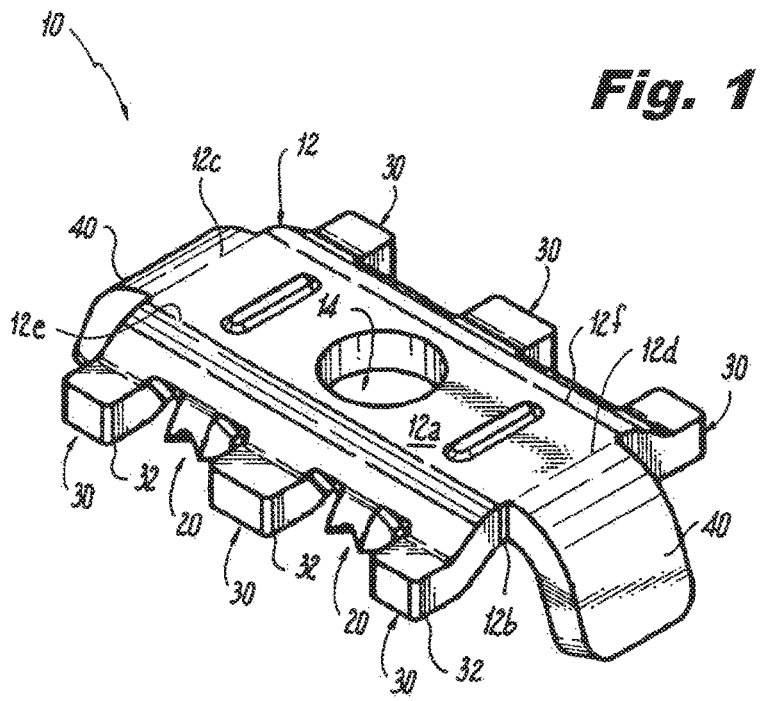
FIG. 1 is a top perspective view of an exemplary embodiment of a bonding clamp according to the present disclosure.

The present disclosure provides descriptions of embodiments for bonding clamps used to assemble photovoltaic (PV) arrays and to provide an electrical bond between PV module frames forming part of the PV arrays, and/or an electrical bond between PV module frames and a rail system forming part of the PV arrays. This specification and the accompanying drawings are to be regarded in an illustrative sense rather than a restrictive sense. Various modifications may be made thereto without departing from the spirit and scope of the present disclosure.

Referring to FIGS. 1-6, an exemplary embodiment of a bonding clamp according to the present disclosure is shown. In this exemplary embodiment, the bonding clamp 10 includes an electrically conductive body 12, at least one electrical bonding member 20, at least one pressure member 30, and at least one spacer member 40. The electrically conductive body 12 has a top surface 12a, a bottom surface 12b, a pair of spacer ends 12c and 12d, and a pair of frame sides 12e and 12f. A mounting structure, which in this exemplary embodiment is an aperture 14, is provided in a center region of the body 12 and is configured to receive a mounting fastener. The body 12 is made of a material that provides sufficient structural integrity to secure PV module frames to a rail system while also capable of conducting electricity to provide an electrical bond. As examples, the body 12 can be made of stainless steel or other conductive steel, aluminum and/or aluminum alloy.

Figure 2:
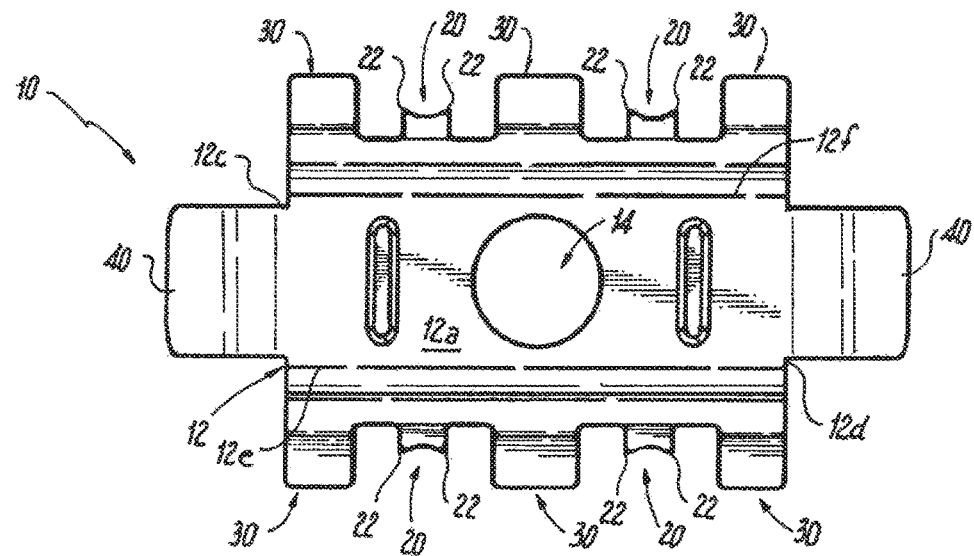
FIG. 2 is a top plan view of the bonding clamp of FIG. 1.
Figure 3:
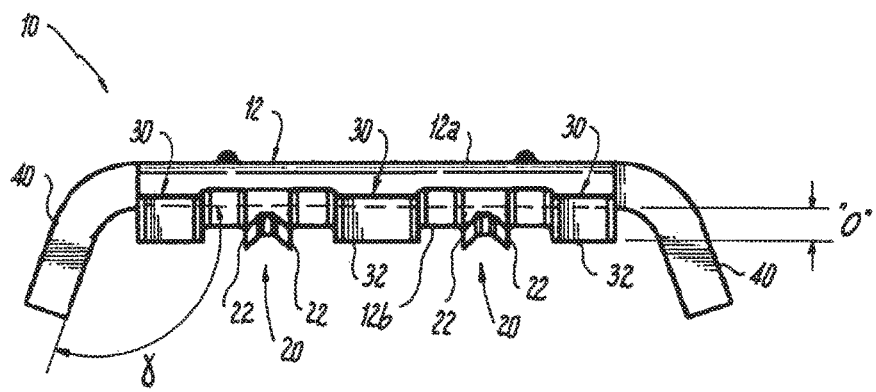
FIG. 3 is a side elevation view of the bonding clamp of FIG. 1 taken from the long side of the bonding clamp.
Figure 4:
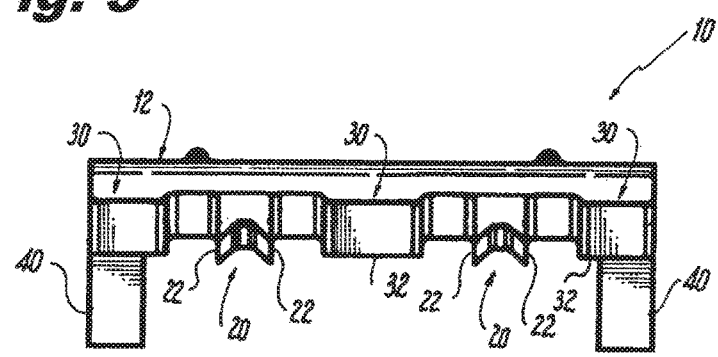
FIG. 4 is a side elevation view of another exemplary embodiment of a bonding clamp according to the present disclosure taken from the long side of the bonding clamp.
Figure 21:
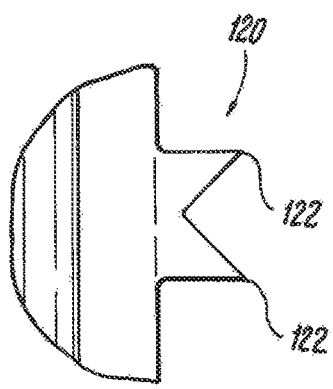
FIG. 21 is an enlarged view of a portion of the bonding clamp similar to FIG. 20, and illustrating another exemplary embodiment of an electrical bonding member according to the present disclosure.

Referring to FIGS. 2 and 3, the at least one electrical bonding member 20 includes a plurality of electrical bonding members, with two electrical bonding members extending from one frame side 12e of the body 12, and two electrical bonding members extending from the other frame side 12f of the body 12. Each electrical bonding member 20 may have one or more piercing surfaces 22 for cutting through or piercing non-conductive coatings, e.g., oxide, paint and/or anodization, on the PV module frames that are typically provided to protect the PV module frames from corrosion. The piercing surfaces may be in the form of, for example, a pointed tip or a serrated tip. However, one skilled in the art would readily appreciate that the form or structure of the piercing surfaces may come in many forms or shapes sufficient to cut through or pierce non-conductive coatings. In the embodiment shown in FIG. 1-6, each electrical bonding member 20 has a plurality of piercing surfaces 22, e.g., two piercing surfaces. To form two piercing surfaces, the electrical bonding member 20 may be a "V-shaped" type tooth structure that, as seen for example in more detail in FIGS. 4 and 21, provides the two piercing surfaces 22.

Figure 5:
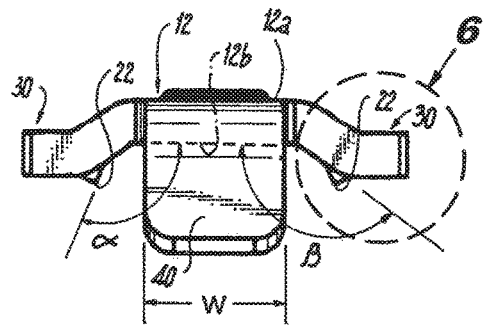
FIG. 5 is a side elevation view of the bonding clamp of FIG. 1 taken from the short side of the bonding clamp.
Figure 6:
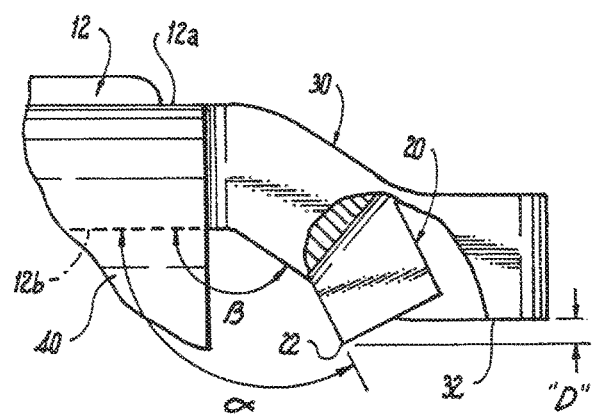
FIG. 6 is an enlarged view of a portion of the bonding clamp of FIG. 5.

As seen in FIGS. 5 and 6, the electrical bonding members 20 extend from the body 12 at an angle "α" relative to the bottom surface 12b of the body 12. The angle of the electrical bonding members 20 should be sufficient so that the piercing surface or surfaces 22 of the electrical bonding members can engage a PV module frame when installed in a PV array, seen in FIGS. 1 and 12, and pierce through any non-conductive surface on the PV module frame. In one exemplary embodiment, the angle "α" of the electrical bonding members 20 may be in the range from about 30 degrees to about 90 degrees, but those skilled in the art would readily appreciate that other angles may be used. The electrical bonding members 20 can be integrally formed with the body 12, or the electrical bonding members 20 can be joined to the body by for example a welded joint. The electrical bonding members 20 are made of a material that provides sufficient structural integrity to pierce non-conductive coatings on PV module frames while also being capable of conducting electricity to provide an electrical bond. As examples, the electrical bonding members 20 can be made of stainless steel or other conductive steel, aluminum and/or aluminum alloy.

Referring again to FIGS. 2, 5 and 6, the at least one pressure member 30 includes a plurality of pressure members, with three pressure members 30 extending from one frame side 12e of the body 12, and three pressure members 30 extending from the other frame side 12f of the body 12. The pressure members 30 are provided to engage PV module frames, and apply force or pressure to the PV module frames in the direction of a rail system so as to secure the PV module frames to the rail system. Each pressure member 30 may have a substantially flat frame engaging surface 32 to ensure an even and uniform engagement between the pressure member 30 and a PV module frame. However, the frame engaging surface of each pressure member may have non-flat or irregular shapes. Each pressure member 30 may be offset from the body 12 relative to the bottom surface 12b of the body, as shown in FIGS. 5 and 6, such that the frame engaging surface 32 of the pressure member 30 lies in a different plane than the bottom surface 12b of the body 12. That is, the frame engaging surface 32 of the pressure member 30 is spaced a distance "O" (seen in FIG. 3) from the bottom surface 12b of the body 12. As an example, the distance "O" may be for example in the range from about 1 mm to about 20 mm. However, one skilled in the art would readily appreciate that the distance "O" may be any distance suitable to exert a force on the bonding clamp 10 as described below. In such an embodiment, when securing the bonding clamp 10 to a rail system, this offset exerts a force on the bonding clamp 10 that opposes the compression (or clamping) force exerted by a fastener used to secure the bonding clamp 10 and PV module frames to a rail system so as to maintain a tight connection of the bonding clamp 10 to the PV module frame. The angle "β" of the offset (seen in FIGS. 5 and 6) should be sufficient so that the frame engaging surface 32 of the pressure members can engage a PV module frame when installed in a PV array, seen in FIGS. 11 and 12. In one exemplary embodiment, the angle "β" of the pressure members 30 may be in the range from about 30 degrees to about 90 degrees, but those skilled in the art would readily appreciate that other angles may be used.

The pressure members 30 can be integrally formed with the body 12, or the pressure members 30 can be joined to the body by for example a welded joint. The pressure members 30 are made of a material that provides sufficient structural integrity to apply pressure or a force on PV module frames. The pressure members can also be made of a material capable of conducting electricity. As examples, the pressure members 30 can be made of stainless steel or other conductive steel, aluminum and/or aluminum alloy. However, one skilled in the art would readily recognize that the pressure members can be made of other electrically conductive and non-conductive materials.

Referring to FIG. 6, in order for the piercing surface or surfaces 22 of the electrical bonding member 20 to pierce non-conductive surfaces of PV module frames, the piercing surface 22 should extend beyond the frame engaging surfaces 32 of the pressure members 30 a distance "D" which can be in for example the range from about 0.01 mm to about 1.5 mm. In this exemplary embodiment, the frame engaging surfaces 32 of the pressure members 30 can also be used as a stop to limit the depth at which the piercing surface 22 of the electrical bonding member 20 penetrates the non-conductive coating and the conductive metal of the PV module frame.

Figure 4A:
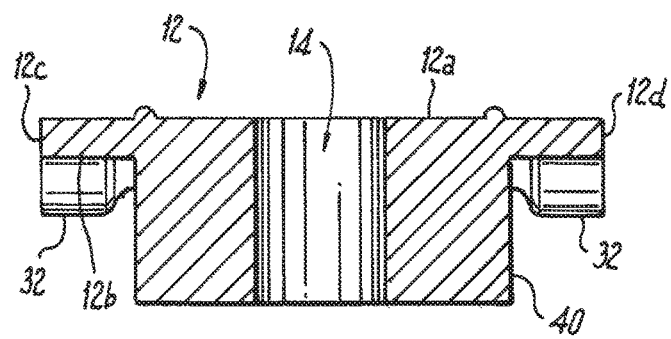
FIG. 4a is a side elevation view in cross-section of another exemplary embodiment of a bonding clamp according to the present disclosure taken from the long side of the bonding clamp.
Figure 9:
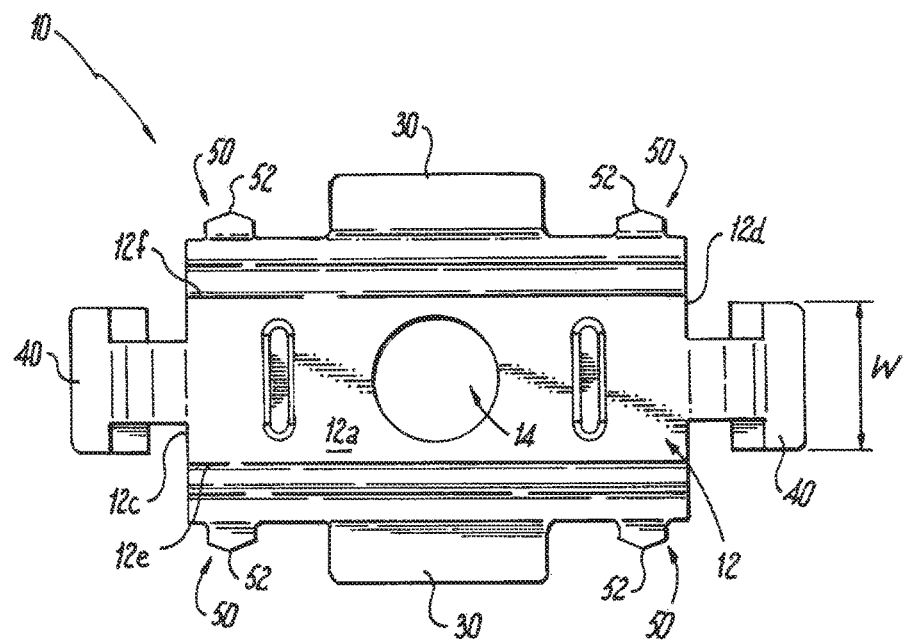
FIG. 9 is a top plan view of another exemplary embodiment of a bonding clamp according to the present disclosure.
Figure 11:
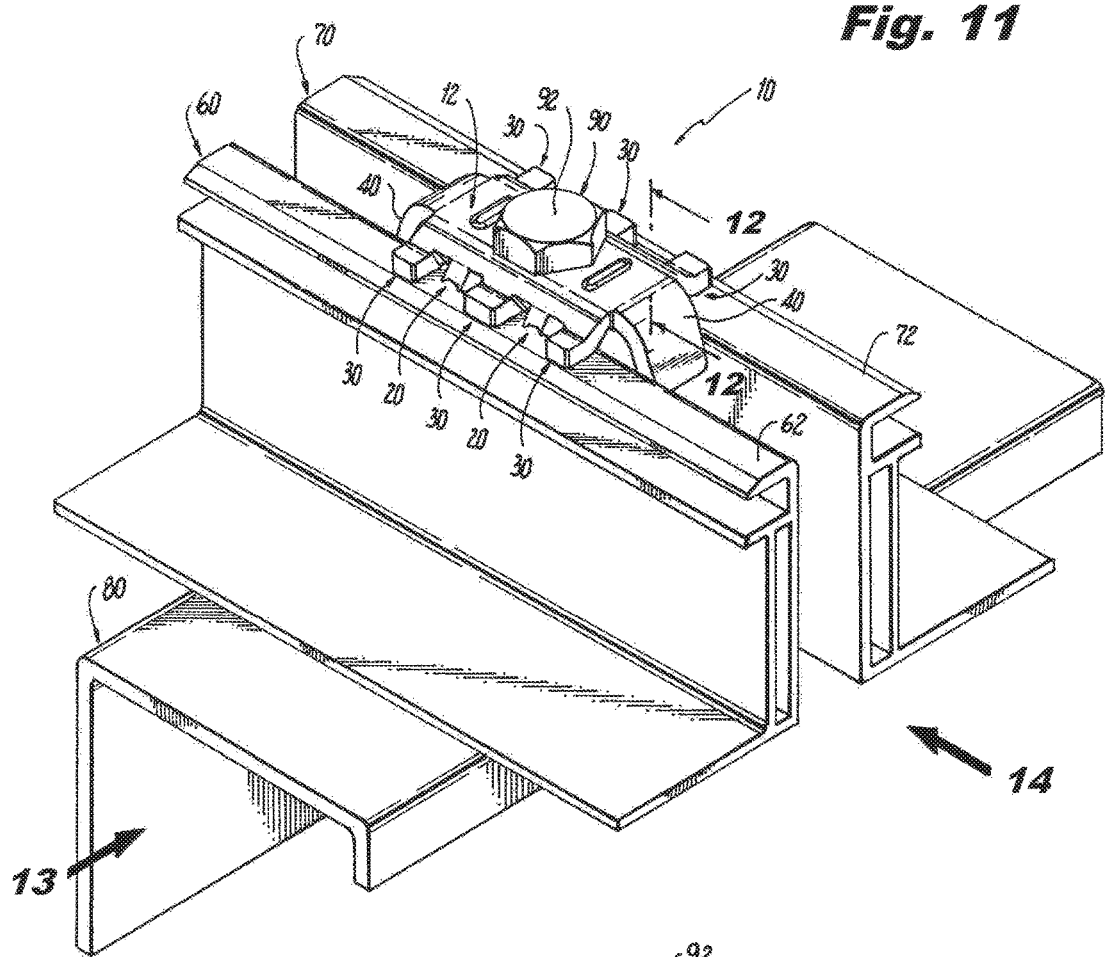
FIG. 11 is a top perspective view of a portion of a photovoltaic array with the bonding clamp of FIG. 1 connecting and bonding photovoltaic module frames to a rail.

Referring again to FIGS. 1-3, extending from the spacer ends 12c and 12d of the body 12 are spacer members 40, e.g., spacer arms. The spacer arms 40 provide a substantially uniform spacing between PV modules frames when the bonding clamp 10 is secured to a rail system. The spacer arms 40 also ensure that the bonding clamp 10 does not rotate when being secured to the rail system so that the electrical bonding members 20 remain engaged with the PV module frame to ensure the electrical bonding between the PV module frames. In one embodiment, the spacer arms 40 extend outward from the body 12, and have a bend which is in substantially the same direction as the electrical bonding members 20 extending from the body 12. The bend in the spacer arms 40 should be sufficient so that the spacer arms 40 fall between PV module frames when installed in a PV array, as seen in FIGS. 3 and 11. In one exemplary embodiment, seen in FIG. 3, the bend radius "δ" of the spacer arm 40 may be in the range of about 30 degrees and about 90 degrees, but other bend radius may be used. The spacer arms 40 can be integrally formed to the body 12, or the spacer arms can be secured to the body 12 by for example a welded joint. In another embodiment, seen in FIG. 4, the spacer arms 40 may extend from the bottom surface 12b of the body 12 and substantially perpendicular to the bottom surface 12b of the body. In another embodiment, seen in FIG. 4a, a single spacer 40 that extends from the bottom surface 12b along a portion of the length of the body 12 or along the length of the body. The spacer arms 40 have a width "W", seen in FIG. 5, which can be in the range from about 0.25 inches to about 1.5 inches. However, one skilled in the art would readily appreciate that the width "W" can be any width that achieves the desired spacing between PV module frames. For example, as shown in FIG. 9, the spacers 40 have a T-shape such that the wider portion of the T-shape has the width "W." This width "W" sets the substantially uniform spacing between PV modules frames when secured to a rail system. The spacer arms 40 can be made of a material that provides sufficient structural integrity to maintain the spacing between PV module frames, and withstand any torque applied to the bonding clamp 10 when tightening a mounting fastener. The spacer arms can also be made of a material capable of conducting electricity. As examples, the spacer arms 40 can be made of stainless steel or other conductive steel, aluminum and/or aluminum alloy. However, one skilled in the art would readily recognize that the spacer arms can be made of other electrically conductive materials and non-conductive materials.

Figure 7:
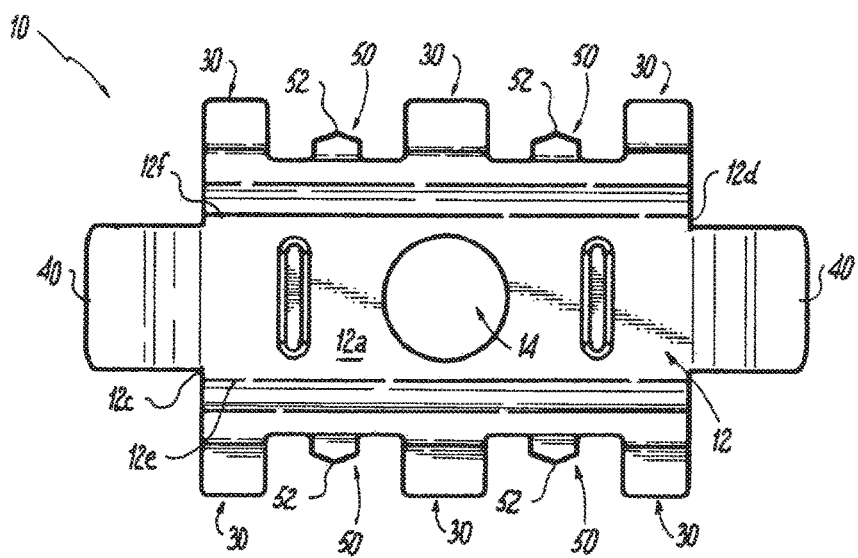
FIG. 7 is a top plan view of another exemplary embodiment of a bonding clamp according to the present disclosure.
Figure 8:
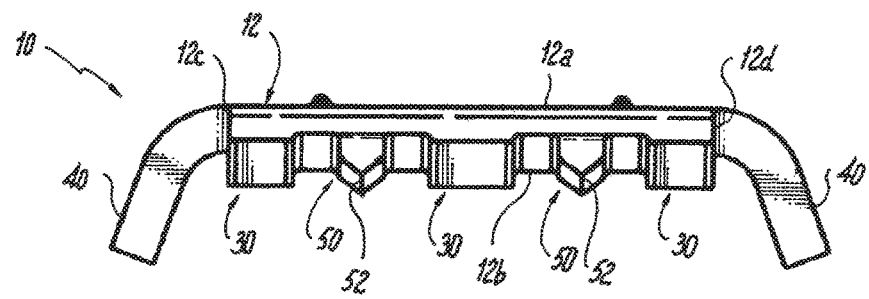
FIG. 8 is a side elevation view of the bonding clamp of FIG. 7 taken from the long side of the bonding clamp.

Referring to FIGS. 7 and 8, another exemplary embodiment of the bonding clamp 10 according to the present disclosure is shown. In this exemplary embodiment, the bonding clamp is substantially similar to the bonding clamp of FIG. 1, except that another exemplary embodiment of the electrical bonding members will be described. Thus, the bonding clamp 10 includes an electrically conductive body 12, at least one pressure member 30, at least one spacer member 40, and at least one electrical bonding member 50. The electrically conductive body 12 has a top surface 12a, a bottom surface 12b, a pair of spacer ends 12c and 12d, and a pair of frame sides 12e and 12f. A mounting structure, which in this exemplary embodiment is an aperture 14, is provided in a center region of the body 12 and configured to receive a mounting fastener. The at least one pressure member 30, and the at least one spacer member 40 are described above.

Continuing to refer to FIGS. 7 and 8, the at least one electrical bonding member 50 includes a plurality of electrical bonding members, with two electrical bonding members extending from one frame side 12e of the body 12, and two electrical bonding members extending from the other frame side 12f of the body 12. In this embodiment, each electrical bonding member has a single piercing surface 52 for cutting through or piercing non-conductive coatings, e.g., oxide, paint and/or anodization, on the PV module frames. The piercing surface may be in the form of, for example, a pointed tip or a serrated tip. However, one skilled in the art would readily appreciate that the piercing surface may come in many forms, shapes and/or structures sufficient to cut through or pierce non-conductive coatings. Similar to the embodiment of FIGS. 1-5, the electrical bonding members 50 extend from the body 12 at an angle "α" relative to the bottom surface 12b of the body 12. The angle of the electrical bonding members 50 should be sufficient so that the piercing surface 52 of each electrical bonding member can engage the PV module frame when the bonding clamp 10 is installed in a PV array, and pierce through any non-conductive coating on the PV module frame. In one exemplary embodiment, the angle of the electrical bonding members 50 may be in the range from about 30 degrees to about 90 degrees, but those skilled in the art would readily appreciate that other angles may be used. The electrical bonding members 50 can be integrally formed with the body 12, or the electrical bonding members 50 can be joined to the body by, for example, a welded joint. The electrical bonding members 50 are made of a material that provides sufficient structural integrity to pierce non-conductive coatings on PV module frames while also being capable of conducting electricity to provide an electrical bond. As examples, the electrical bonding members 50 can be made of stainless steel or other conductive steel, aluminum and/or aluminum alloy.

Figure 10:
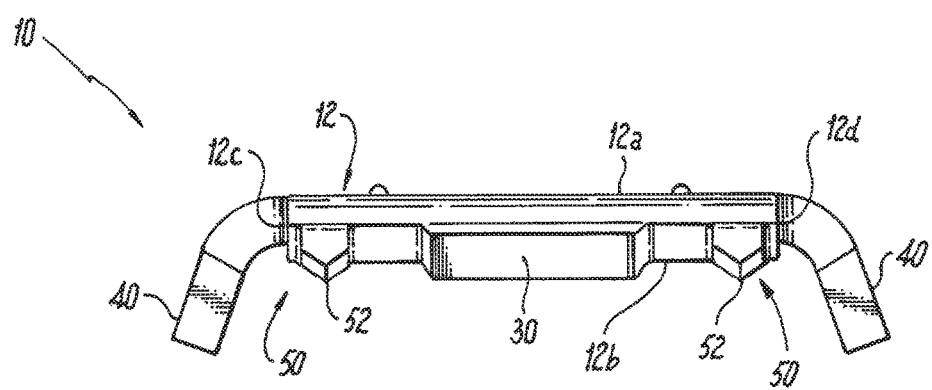
FIG. 10 is a side elevation view of the bonding clamp of FIG. 9 taken from the long side of the bonding clamp.

Referring to FIGS. 9 and 10, another exemplary embodiment of the bonding clamp 10 according to the present disclosure is shown. In this exemplary embodiment, the bonding clamp is similar to the bonding clamp of FIGS. 7 and 8, except a single pressure member extends from each side of the body and the spacers are T-shaped members as described above. More specifically, the bonding clamp 10 includes an electrically conductive body 12. The electrically conductive body 12 has a top surface 12a, a bottom surface 12b, a pair of spacer ends 12c and 12d, and a pair of frame sides 12e and 12f. A pressure member 30 extends from each frame side 12e and 12f of the body 12, at least one spacer member 40 extends from the spacer ends 12c and 12d of the body 12, and at least one electrical bonding member 50 extending from each frame side 12e and 12f of the body 12. A mounting structure, which in this exemplary embodiment is an aperture 14, is provided in a center region of the body 12 and configured to receive a mounting fastener. Embodiments of the pressure member 30, the at least one spacer member 40 and the at least one electrical bonding member 50 are described in detail above.

Figure 12:
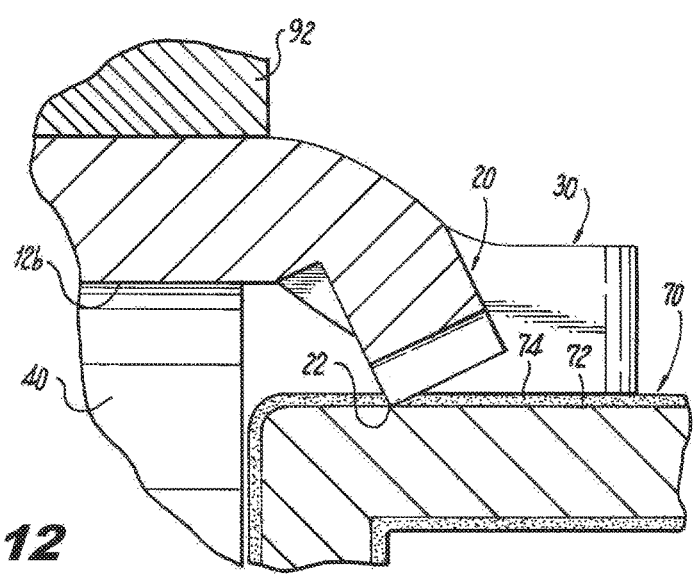
FIG. 12 is an enlarged partial cross-sectional view of the bonding clamp in FIG. 11 taken along line 12-12.
Figure 13:
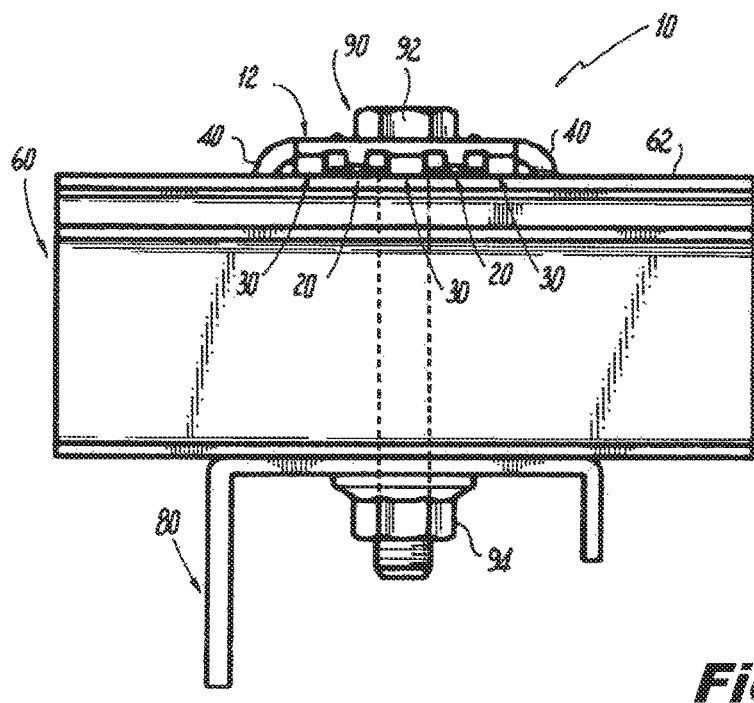
FIG. 13 is a side elevation view of the photovoltaic array of FIG. 11 taken along line 13, and illustrating the bonding clamp of FIG. 1 connecting and bonding the photovoltaic module frames to the rail using a nut and bolt fastener.
Figure 14:
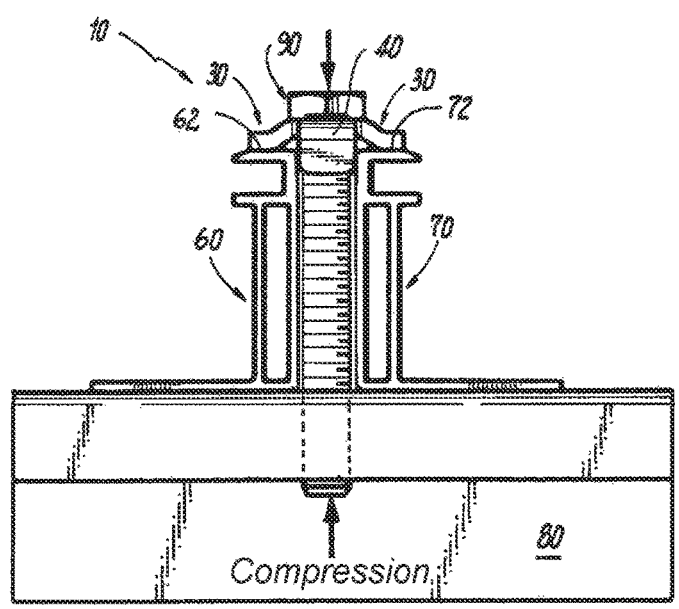
FIG. 14 is a side elevation view of the photovoltaic array of FIG. 11 taken from line 14, and illustrating the bonding clamp of FIG. 1 connecting and bonding the photovoltaic module frames to the rail.
Figure 15:
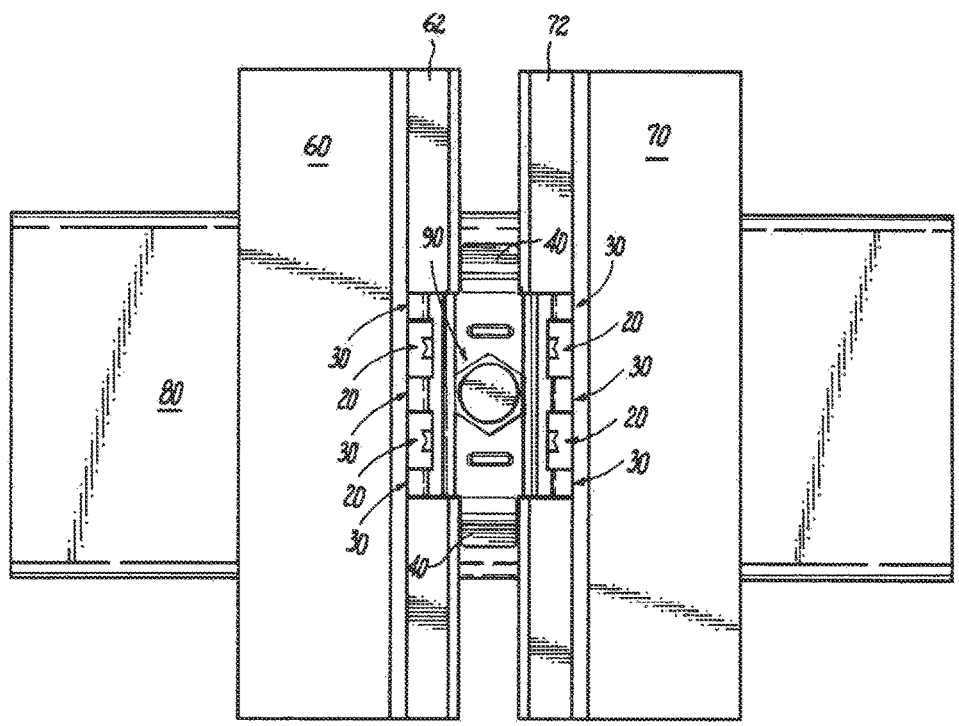
FIG. 15 is a top plan view of the photovoltaic array of FIG. 11.

Turning now to FIGS. 11-15, the bonding clamp 10 of the present disclosure will be described when connecting to PV module frames and a rail system. Referring to FIG. 11, portions of two PV module frames 60 and 70 are shown in a position at rest on a rail 80 of a rail system that supports a PV array. The bonding clamp 10 is positioned so that the pressure members 30 extending from the frame side 12e of the body 12 can rest on a top surface 62 of PV module frame 60, and so that pressure members 30 extending from the frame side 12f of the body 12 can rest on a top surface 72 of PV module frame 70. In the embodiment shown, with the pressure members 30 resting on the top surfaces 62 and 72 of the PV module frames 60 and 70, respectively, two electrical bonding members 20 are positioned to pierce any non-conductive coating on PV module frame 60, and two electrical bonding members 20 are positioned to pierce any non-conductive coating on PV module frame 70, as shown in FIGS. 11 and 12. It should be noted that one skilled in the art would readily recognize that only one electrical bonding member 20 may be positioned to pierce the non-conductive coating on each PV module frame, or that more than two electrical bonding members 20 can be positioned to pierce any non-conductive coating on each PV module frame. As noted above, the spacer arms 40 extending between the PV module frames 60 and 70 prevent the body 12 from shifting or rotating so that the one or more electrical bonding members 20 remain in a position to pierce the non-conductive coating on the top surface 62 of PV module frame 60, and so that one or more electrical bonding members 20 remain in a position to pierce the non-conductive coating 74 on the top surface 72 of PV module frame 70. Further, with the pressure members 30 resting on the PV module frames 60 and 70, the spacer arms 40 are positioned between the PV module frames to provide a substantially uniform spacing between the PV module frames 60 and 70, as seen in FIGS. 14 and 15.

To secure the PV module frames 60 and 70 to the rail 80, a mounting fastener 90 (e.g., a nut and bolt or rivets) can be used. Referring to FIGS. 13 and 14, a bolt 92 is passed through aperture 14 in the body 12, between the PV module frames 60 and 70, and through an aperture in rail 80. A nut 94 is then attached to the bolt 92 and tightened to secure the bonding clamp 10 to the PV module frames 60 and 70, and to secure the PV module frames to the rail 80. When the nut 94 and bolt 92 are tightened, each electrical bonding member 20 positioned over the top surface 62 of the PV module frame 60 cut through or pierce the non-conductive coating on the top surface 62 so that the conductive metal of the body 12 is in electrical contact with the conductive metal of the PV module frame 60 to provide an electrical bond. Similarly, and referring to FIG. 12, when the nut and bolt are tightened, each electrical bonding member 20 positioned over the top surface 72 of the PV module frame 70 cut through or pierce the non-conductive coating 74 on the top surface 72 so that the conductive metal of the body 12 is in electrical contact with the conductive metal of the PV module frame 70 to provide an electrical bond. As described above, in the embodiment where the pressure members 30 are offset from the body 12, when the fastener 90 is tightened the offset of the pressure members 30 exert an upward force that opposes the compression (or clamping) force of the tightened fastener 90 so as to maintain a tight connection between the bonding clamp 10 and rail system.

Referring now to FIGS. 16-21, another exemplary embodiment of a bonding clamp according to the present disclosure is shown. The bonding clamp according to this exemplary embodiment is for use as a bonding clamp for a single PV module frame, such as at an end of row in a PV array. Such bonding clamps may also be called an end clamps. In this exemplary embodiment, the bonding clamp 100 includes an electrically conductive body 110, at least one electrical bonding member 120, at least one pressure member 130, and a frame pusher member 140. The electrically conductive body 110 has a top surface 110a, a bottom surface 110b, a frame side 110c and a frame side 110d. A mounting structure, which in this exemplary embodiment is an aperture 112, is provided in a center region of the body 110 and configured to receive a mounting fastener. The body 110 is made of a material that provides sufficient structural integrity to secure PV module frames to a rail system while also being capable of conducting electricity to provide an electrical bond. As examples, the body 110 can be made of stainless steel or other conductive steel, aluminum and/or aluminum alloy.

Figure 16:
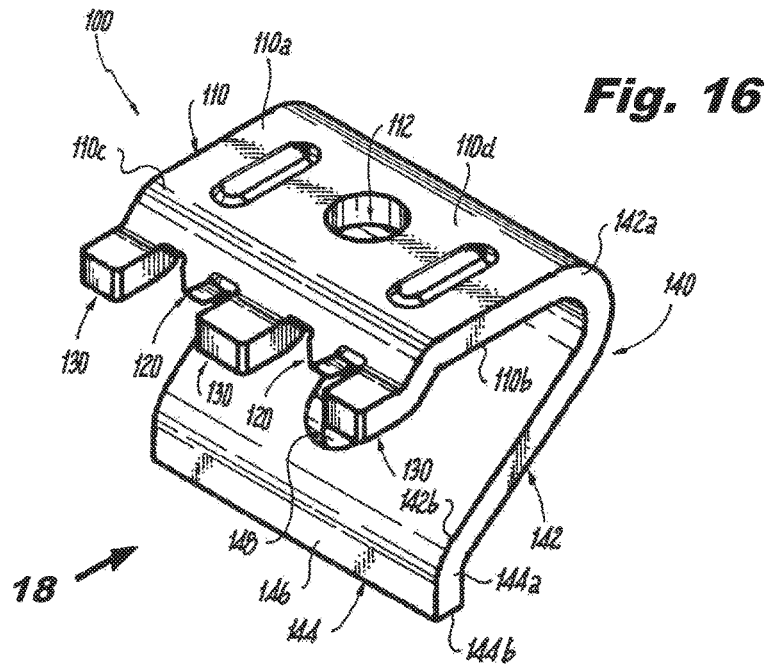
FIG. 16 is a top perspective view of another exemplary embodiment of a bonding clamp according to the present disclosure.
Figure 17:
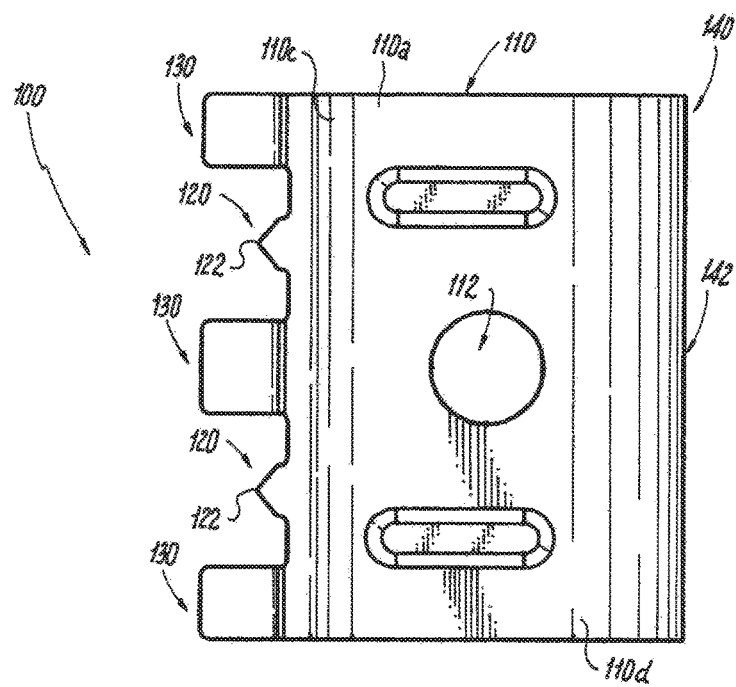
FIG. 17 is a top plan view of the bonding clamp of FIG. 16.
Figure 18:
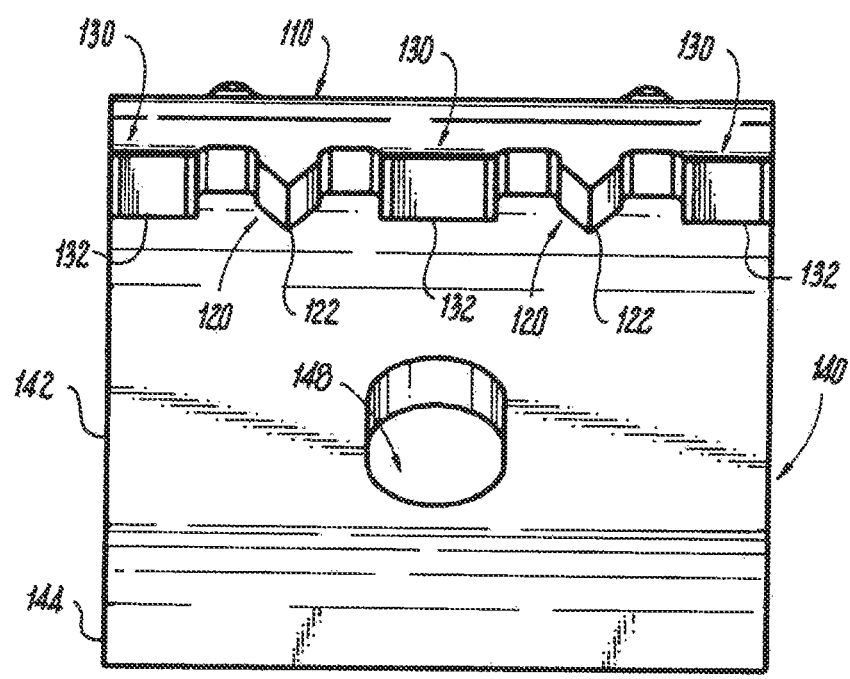
FIG. 18 is a perspective view of the bonding clamp of FIG. 16 taken from line 18.

Referring to FIGS. 16-18, the at least one electrical bonding member 120 includes a plurality of electrical bonding members, e.g., two electrical bonding members, extending from frame side 110c of the body 110. Each electrical bonding member 120 may have one or more piercing surfaces 122 for cutting through or piercing non-conductive coatings, e.g., oxide, paint and/or anodization, on a PV module frame. The piercing surfaces may be in the form of, for example, a pointed tip or a serrated tip. However, one skilled in the art would readily appreciate that the piercing surfaces may come in many forms, shapes and/or structures sufficient to cut through or pierce non-conductive coatings. In the embodiment of FIGS. 16-20, each electrical bonding member 120 has a single piercing surface 122, e.g., a pointed tip, for cutting through or piercing non-conductive coatings on PV module frames. In another embodiment, seen in FIG. 21, each electrical bonding member 120 may have a plurality of piercing surfaces, such as the "V-shaped" type tip structure described above with reference to FIGS. 1-5 that provides two piercing surfaces.

Figure 19:
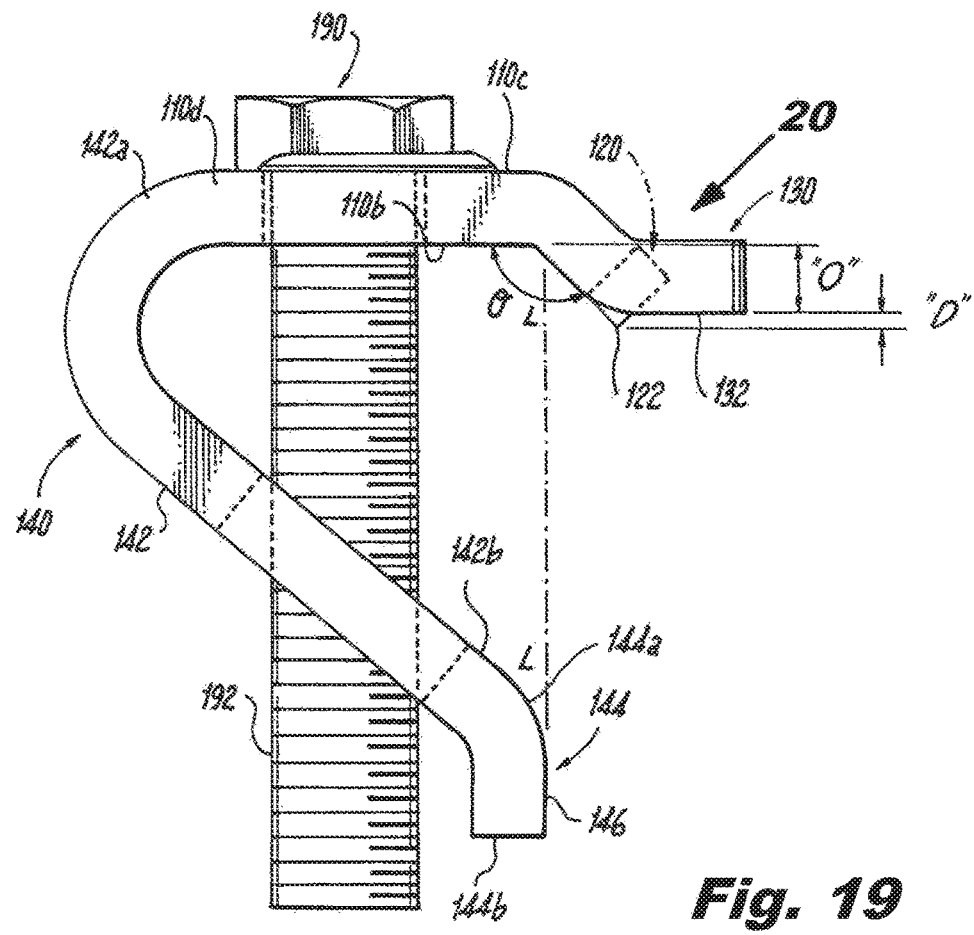
FIG. 19 is a side elevation view of the bonding clamp of FIG. 16.
Figure 20:
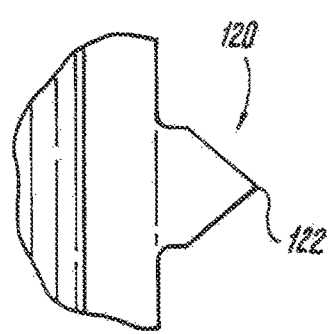
FIG. 20 is an enlarged view of a portion of the bonding clamp of FIG. 19 taken from line 20, and illustrating an exemplary embodiment of an electrical bonding member according to the present disclosure.

Referring to FIGS. 19 and 23, the electrical bonding members 120 extend from the body 110 at an angle "θ" relative to the bottom surface 110b of the body 110. The angle of the electrical bonding members 120 should be sufficient so that the piercing surface or surfaces 122 of the electrical bonding members can engage the PV module frame when installed in a PV array, as seen in FIG. 23, and pierce through any non-conductive surface on the PV module frame. In one exemplary embodiment, the angle "θ" of the electrical bonding members 120 may be in for example the range from about 30 degrees to about 90 degrees, but those skilled in the art would readily appreciate that other angles may be used.

The electrical bonding members 120 can be integrally formed with the body 110 or the electrical bonding members 120 can be joined to the body by for example a welded joint. The electrical bonding members 120 are made of a material that provides sufficient structural integrity to pierce non-conductive coatings on PV module frames while also being capable of conducting electricity to provide an electrical bond. As examples, the electrical bonding members 120 can be made of stainless steel or other conductive steel, aluminum and/or aluminum alloy.

Referring again to FIGS. 16-19, the at least one pressure member 130 includes, in this embodiment, a plurality of pressure members 130, e.g., three pressure members, extending from the frame side 110c of the body 110. However, a single pressure member may be used as described above with respect to FIGS. 9 and 10. The pressure members 130 are provided to engage PV module frames and apply a force or pressure to the PV module frames in the direction of a rail system so as to secure the PV module frames to a rail system. Each pressure member 130 may have a substantially flat frame engaging surface 132 to ensure an even and uniform engagement between the pressure member 130 and a PV module frame. Each pressure member 130 may be offset from the body 110 relative to the bottom surface 110b of the body, as shown in FIG. 19, such that the frame engaging surface 132 of the pressure member 130 lies in a different plane than the bottom surface 110b of the body 110. That is, the frame engaging surface 132 of the pressure member 130 is spaced a distance "O" from the bottom surface 110b of the body 110. As an example, the distance "O" may be in for example the range from about 1 mm to about 20 mm. However, one skilled in the art would readily appreciate that the distance "O" may be any distance suitable to exert a force on the bonding clamp 10 as described herein. In such an embodiment, when securing the bonding clamp 100 to a rail system, this offset exerts a force on the bonding clamp 100 that opposes the compression (or clamping) force of a fastener used to secure the bonding clamp 100 and PV module frames to a rail system so as to maintain a tight connection of the bonding clamp 100 to the PV module frame. The angle "ω" of the offset (seen in FIG. 23) should be sufficient so that the frame engaging surface 132 of the pressure members can engage a PV module frame when installed in a PV array. In one exemplary embodiment, the angle "ω" of the pressure members 130 may be in for example the range from about 30 degrees to about 90 degrees, but those skilled in the art would readily appreciate that other angles may be used.

The pressure members 130 can be integrally formed with the body 110 or the pressure members 130 can be joined to the body by for example a welded joint. The pressure members 130 can be made of a material that provides sufficient structural integrity to apply pressure or a force on PV module frames. The pressure members can also be made of a material capable of conducting electricity. As examples, the pressure members 130 can be made of stainless steel or other conductive steel, aluminum and/or aluminum alloy. However, one skilled in the art would readily recognize that the pressure members can be made of other electrically conductive and non-conductive materials.

Turning to FIGS. 19 and 23, in order for the piercing surface 122 of the electrical bonding member 120 to pierce non-conductive surfaces of PV module frames, the piercing surface 122 should extend beyond the frame engaging surfaces 132 of the pressure members 130 a distance "D" which may be in for example the range from about 0.01 mm to about 1.5 mm. In this exemplary embodiment, the frame engaging surfaces 132 of the pressure members 130 can also be used as a stop to limit the depth at which the piercing surface 122 of the electrical bonding member 120 penetrates the non-conductive coating and the conductive metal of the PV module frame.

Referring to FIGS. 19 and 22, the frame pusher member 140 will be described. In this exemplary embodiment, the frame pusher member 140 is a spring like structure in which compression force "C" exerted when tightening a mounting fastener between the bonding clamp 100, the PV module frame 160, and the rail 180 of a rail system cause the frame pusher member 140 to exert a force "F" against a side wall 164 of a PV module frame 160 which is orthogonal to the compression force "C".

The frame pusher member 140 includes a first leg 142 having one end 142a connected or coupled to the frame side 110d of the body 110. The other end 142b of the first leg 142 is attached to one end 144a of a second leg 144 of the frame pusher member 140. The other end 144b of the second leg 144 is a free end. The frame pusher member 140 can be integrally formed with the body 110 or the frame pusher member 140 can be joined to the body by for example a welded joint. The frame pusher member 140 is made of a material that provides sufficient structural integrity to apply pressure or a force on PV module frames, and to withstand torque applied to the bonding clamp 100. The frame pusher member can also be made of a material capable of conducting electricity. As examples, the frame pusher member 140 can be made of stainless steel or other conductive steel, aluminum and/or aluminum alloy. However, one skilled in the art would readily recognize that the pressure members can be made of other electrically conductive materials and non-conductive materials.

The second leg 144 of the frame pusher member 140 also includes a frame contacting surface 146 that engages a side wall 164 (seen in FIG. 22) of the PV module frame 160 when the bonding clamp 100 is installed. The frame contacting surface 146 of the frame pusher member 140 is aligned to be in close proximity with the frame side 110c of the body 110, as represented by line L-L in FIG. 19. This alignment ensures that the electrical bonding members 120 and the pressure members 130 are not blocked by the second leg 144 from fully engaging a top surface of a PV module frame. Further, the frame pusher member 140 when engaging the PV module frame 160 prevents the body 110 from shifting or rotating so that the one or more electrical bonding members 120 remain in a position to pierce the non-conductive coating 166 on PV module frame 160 (seen in FIG. 23). The frame contacting surface 146 may include one or more electrical bonding members that may have one or more piercing surfaces that may be in the form of, for example, pointed tips, serrated tips or other forms, shapes and/or structures sufficient to cut through or pierce non-conductive coatings on the PV module frame 160. A mounting structure, which in this exemplary embodiment is an aperture 148 seen in FIGS. 16 and 19, is provided in a center region of the first leg 142 and aligned with the aperture 112 in body 110. The mounting structure 148 is configured to receive the mounting fastener and permit the mounting fastener to pass through the first leg.

Turning now to FIGS. 22-26, the bonding clamp 100 of the present disclosure will be described when connecting a PV module frame and a rail system. Referring to FIG. 22, a portion of a PV module frame 160 is shown in a position at rest on a rail 180 of a rail system that supports a PV array. The bonding clamp 100 is positioned so that the electrical bonding members 120 and pressure members 130 extending from the body 110 can rest on a top surface 162 of PV module frame 160. In the embodiment shown, with the pressure members 130 resting on the top surface 162 of the PV module frame 160, two electrical bonding members 120 are positioned to pierce any non-conductive coating on PV module frame 160 (seen inn FIG. 23). However, one skilled in the art would readily recognize that one electrical bonding member 120 may be positioned to pierce any non-conductive coating on the PV module frame 160, or that more than two electrical bonding members 120 can be positioned to pierce any non-conductive coating on the PV module frame. One skilled in the art would also recognize that one, two or more than three pressure members 130 may be positioned to engage PV module frames and apply a force or pressure to the PV module frames in the direction of a rail system so as to secure the PV module frames to a rail system.

Figure 24:
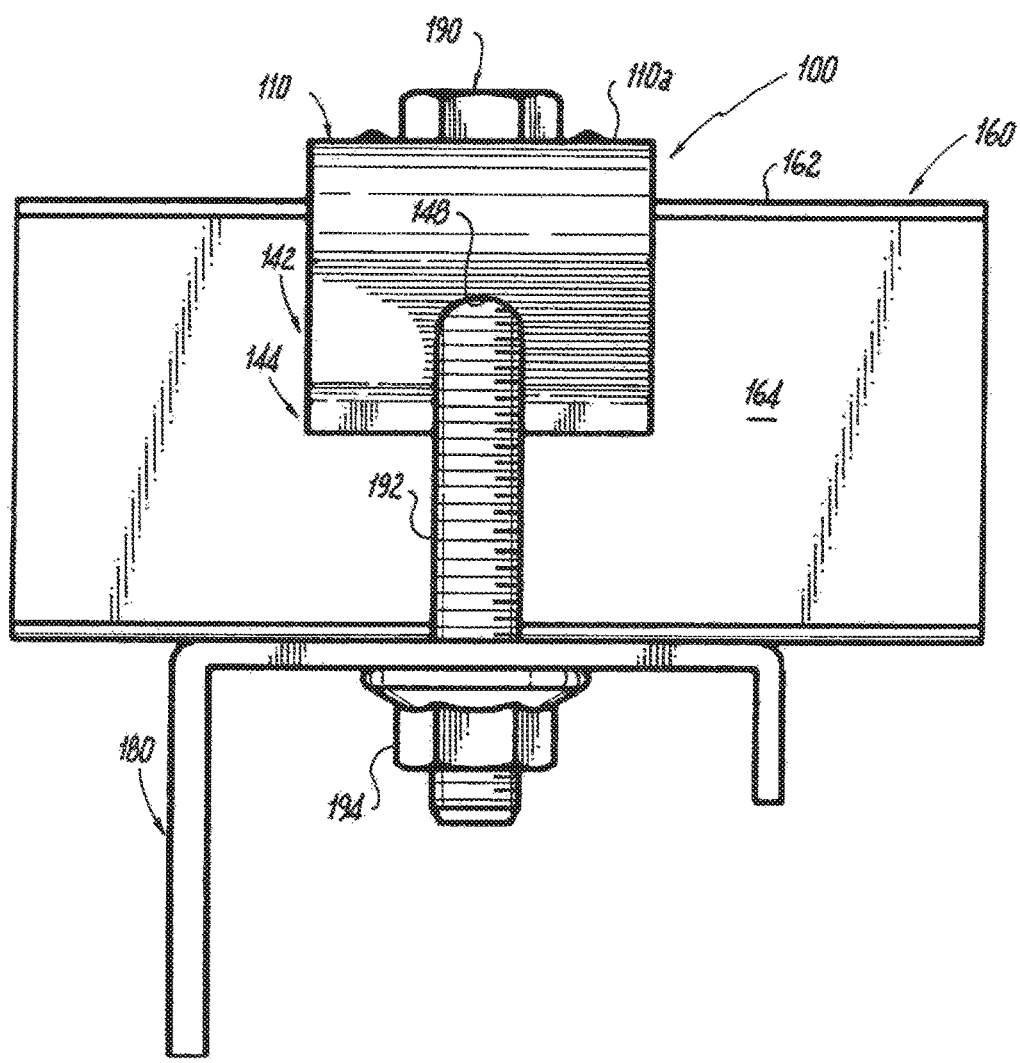
FIG. 24 is an elevation view of the photovoltaic array of FIG. 22 taken along line 24, and illustrating the bonding clamp of FIG. 16 connecting and bonding the photovoltaic module frame to the rail using a nut and bolt fastener.
Figure 25:
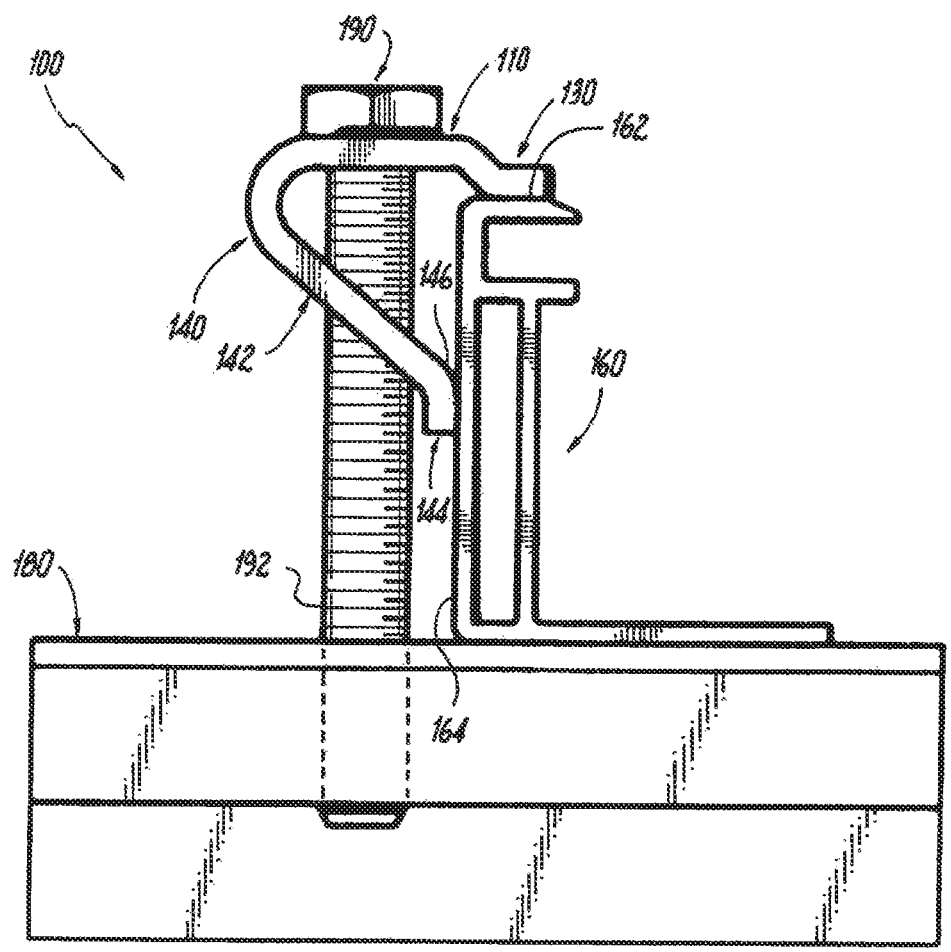
FIG. 25 is an elevation view of the photovoltaic array of FIG. 22 taken from line 25, and illustrating the bonding clamp of FIG. 16 connecting and bonding the photovoltaic module frame to the rail.
Figure 26:
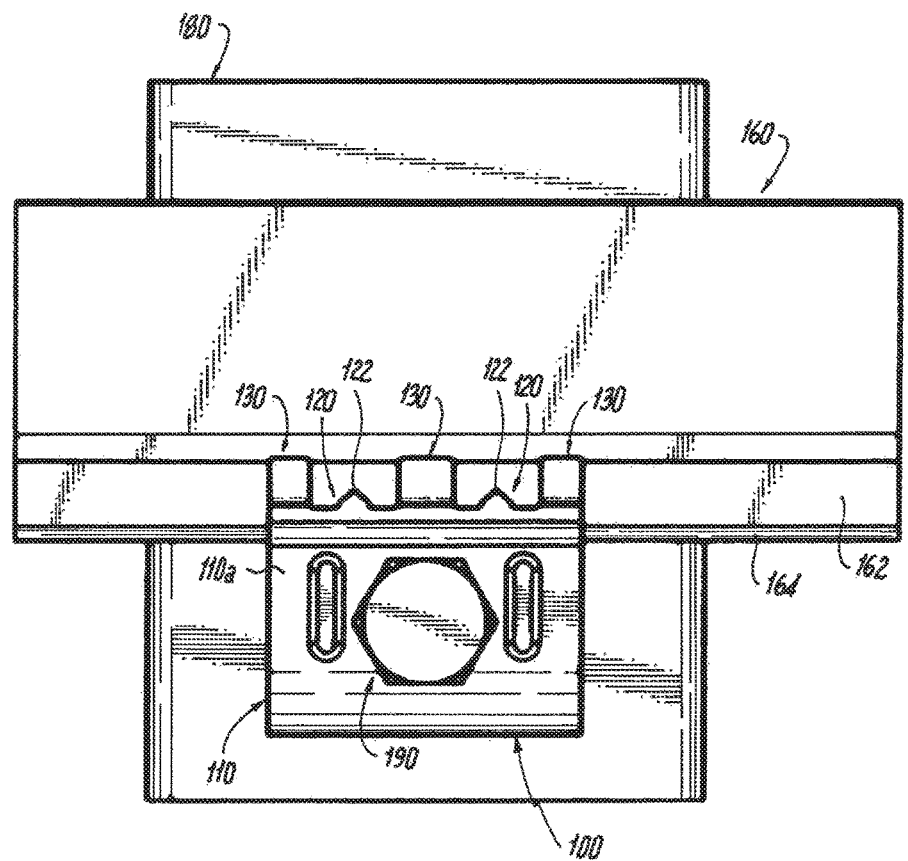
FIG. 26 is a top plan view of the portion of the photovoltaic array of FIG. 22.

Turning to FIGS. 24 and 25, to secure the PV module frame 160 to the rail 180, a mounting fastener 190 (e.g., a nut and bolt or rivets) can be used. In this exemplary embodiment, a bolt 192 is passed through aperture 112 in the body 110, through aperture 148 in the frame pusher member 140 and through an aperture in rail 180. A nut 194 is then attached to the bolt 192 and tightened to secure the bonding clamp 100 to the PV module frame 160, and to secure the PV module frame 160 to the rail 180. When the nut 194 and bolt 192 are tightened, each electrical bonding member 120 positioned over the top surface 162 of the PV module frame 160 cut through or pierce the non-conductive coating 166 (seen in FIG. 23) on the top surface 162 so that the conductive metal of the body 110 is in electrical contact with the conductive metal of the PV module frame 160 via the electrically conductive electrical bonding member 120 to provide an electrical bond. As noted above, when the nut and bolt are tightened, the force "F" (seen in FIG. 22) causes the frame pusher member 140 to engage and apply pressure to the side wall 164 of the PV module frame 160. This force prevents the body 110 from shifting or rotating so that the one or more electrical bonding members 120 remain in a position to pierce the non-conductive coating 166 on PV module frame 160. As previously described, in the configuration where the pressure members 130 are offset from the body 110, when the fastener 190 is tightened the offset exerts a force that opposes the compression (or clamping) force of the tightened fastener 190 so as to maintain a tight connection between the bonding clamp 100 and the PV module frame.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A bonding clamp comprising:
    an electrically conductive body having a bottom surface and a mounting structure for receiving a mounting fastener;
    a plurality of pressure members, each of the plurality of pressure members having a structure engaging surface and extending from the electrically conductive body such that the engaging surface is offset from and substantially parallel to the bottom surface, the structure engaging surface is capable of applying pressure to the one or more structures to be clamped;
    a plurality of electrical bonding members extending from the electrically conductive body at an angle relative to the bottom surface, each of the plurality of electrical bonding members having at least one piercing surface that extends beyond the structure engaging surface of adjacent pressure members so that the at least one piercing surface is capable of piercing non-conductive surfaces on the one or more structures to be clamped; and
    at least one spacer member extending from the electrically conductive body at an angle relative to the bottom surface of the electrically conductive body.

2. The bonding clamp according to claim 1, wherein at least one spacer member comprises:
    a first spacer member extending from the electrically conductive body at an angle relative to the bottom surface of the body; and
    a second spacer member extending from the electrically conductive body at an angle relative to the bottom surface of the body.

3. The bonding clamp according to claim 2, wherein the first spacer member extends from one end of the electrically conductive body, and the second spacer member extends from an opposite end of the electrically conductive body.

4. The bonding clamp according to claim 1, wherein at least one spacer member comprises a single spacer that extends from the bottom surface of the body along at least a portion of the length of the body.

5. The bonding clamp according to claim 1, wherein the mounting structure comprises an aperture.

6. The bonding clamp according to claim 1, wherein the at least one piercing surface comprises a pointed tip.

7. The bonding clamp according to claim 1, wherein the at least one piercing surface comprise a serrated tip.

8. The bonding clamp according to claim 1, wherein the at least one piercing surface on each of the plurality of electrical bonding members comprises a plurality of piercing surfaces.

9. The bonding clamp according to claim 8, wherein each of the plurality of piercing surfaces comprise a pointed tip.

10. The bonding clamp according to claim 8, wherein each of the plurality of piercing surfaces comprise a serrated tip.

11. A bonding clamp comprising:
an electrically conductive body having a bottom surface, a first end, a second end, and a mounting structure for receiving a mounting fastener;
a plurality of pressure members extending from the electrically conductive body, wherein each pressure member is offset from the bottom surface of the electrically conductive body such that a structure engaging surface of each pressure member lies in a different plane than the bottom surface of the electrically conductive body, and wherein each pressure member is capable of applying pressure to the one or more structures to be clamped;
a plurality of electrical bonding members extending from the electrically conductive body such that at least a portion of each of the plurality of electrical bonding members extends below the structure engaging surface of adjacent pressure members and is capable of piercing non-conductive surfaces on one or more structures to be clamped;
a first spacer member extending from the first end of the electrically conductive body; and
a second spacer member extending from the second end of the electrically conductive body.

12. The bonding clamp according to claim 11, wherein the mounting structure comprises an aperture.

13. The bonding clamp according to claim 11, wherein the first and second spacer members extend from the electrically conductive body at an angle relative to the bottom surface of the electrically conductive body.

14. The bonding clamp according to claim 11, wherein the angle is one of less than 90 degrees and 90 degrees.

15. The bonding clamp according to claim 11, wherein the portion of each of the plurality of electrical bonding members extending below the structure engaging surface of adjacent pressure members comprises at least one piercing surface.

16. The bonding clamp according to claim 15, wherein the at least one piercing surface comprises one of a pointed tip and a serrated tip.

17. A bonding clamp comprising:
an electrically conductive body having a bottom surface and a mounting structure for receiving a mounting fastener;
a plurality of pressure members, each of the plurality of pressure members having a structure engaging surface and extending from the electrically conductive body such that the engaging surface is offset from and substantially parallel to the bottom surface, the structure engaging surface is capable of applying pressure to the one or more structures to be clamped; a plurality of electrical bonding members extending from the electrically conductive body at an angle relative to the bottom surface, each of the plurality of electrical bonding members having at least one piercing surface that extends beyond the structure engaging surface of adjacent pressure members so that the at least one piercing surface is capable of piercing non-conductive surfaces on the one or more structures to be clamped;
wherein the plurality of electrical bonding members are arranged to extend from the electrically conductive body such that one of the plurality of electrical bonding members is positioned adjacent at least one of the plurality of pressure members; and
at least one spacer member extending from the electrically conductive body at an angle relative to the bottom surface of the electrically conductive body.

18. The bonding clamp according to claim 17, wherein at least one spacer member comprises:
a first spacer member extending from the electrically conductive body at an angle relative to the bottom surface of the electrically conductive body; and
a second spacer member extending from the electrically conductive body at an angle relative to the bottom surface of the electrically conductive body.

19. The bonding clamp according to claim 18, wherein the first spacer member extends from one end of the electrically conductive body, and the second spacer member extends from an opposite end of the electrically conductive body.

20. The bonding clamp according to claim 17, wherein the plurality of electrical bonding members are arranged to extend from the electrically conductive body such that one of the plurality of electrical bonding members is positioned between two of the plurality of pressure members.

* * * * *